(12) United States Patent
Yamamoto

(10) Patent No.: US 9,462,178 B2
(45) Date of Patent: Oct. 4, 2016

(54) IMAGING APPARATUS

(71) Applicant: CANON KABUSHIKI KAISHA, Tokyo (JP)

(72) Inventor: Hideaki Yamamoto, Kawasaki-shi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/597,956

(22) Filed: Jan. 15, 2015

(65) Prior Publication Data

US 2015/0207981 A1 Jul. 23, 2015

(30) Foreign Application Priority Data

Jan. 21, 2014 (JP) .................................. 2014-008572

(51) Int. Cl.
*G02B 13/16* (2006.01)
*H04N 5/225* (2006.01)
*H04N 5/232* (2006.01)
*G03B 13/36* (2006.01)
*H04N 1/21* (2006.01)

(52) U.S. Cl.
CPC .......... *H04N 5/23212* (2013.01); *G03B 13/36* (2013.01); *H04N 1/2112* (2013.01)

(58) Field of Classification Search
CPC . H04N 5/23212; H04N 1/2112; G03B 13/36
USPC ................ 348/335, 340, 345, 348, 350, 352
See application file for complete search history.

(56) References Cited

U.S. PATENT DOCUMENTS

2008/0267601 A1* 10/2008 Kobayashi ............. G03B 13/32
396/91

FOREIGN PATENT DOCUMENTS

JP 2006322970 A 11/2006

* cited by examiner

*Primary Examiner* — Yogesh Aggarwal
(74) *Attorney, Agent, or Firm* — Canon U.S.A., Inc. IP Division

(57) ABSTRACT

A focus detection apparatus includes the following: a viewing field mask disposed more on a photoelectric conversion element side than an expected imaging plane of an imaging lens and configured to determine contours of optical images formed on a detection plane, a sensor including a photoelectric conversion element disposed extending outside the optical images and including a plurality of pairs of focus detection regions in each of which the optical images are detected, a memory configured to store, as adjustment values, pieces of data indicating positions of effective ranges in the pairs of focus detection regions, in a plurality of storage areas in a way that each of the pieces of data is stored in a corresponding one of the storage areas, and a control unit configured to obtain the adjustment value data from the memory and perform focus detection for the imaging lens to control focus adjustment operation.

8 Claims, 9 Drawing Sheets

IMAGING APPARATUS

BACKGROUND OF THE INVENTION

1. Field of the Invention

The present invention relates to a focus detection apparatus of an imaging apparatus, and particularly to a technique for enabling focus detection in a wider range.

2. Description of the Related Art

With a widespread use of imaging apparatuses represented by digital cameras and video cameras, demands for higher quality and downsizing of the imaging apparatuses are more and more increasing. In particular, there are demands for wider field of view and downsizing of a focus detection apparatus that detects the focusing state of an imaging lens of an imaging apparatus. A focus detection apparatus that employs the Through-The-Lens (TTL) phase difference method forms a plurality of optical images with a plurality of light fluxes each of which has passed through a different one of a plurality of divided regions of an exit pupil of an imaging lens, and then detects the focusing state of the imaging lens based on a relative positional relationship between the plurality of optical images.

In the above-described focus detection apparatus, a photoelectric conversion element for detecting information related to the focusing state detects light in a wide range of an imaging region. This enables focus detection over a wide range. The size of an optical image on the photoelectric conversion element is determined by the size of a viewing field mask for limiting a light flux entering a focus detection optical system, and the magnification of a secondary imaging lens for forming an optical image on the photoelectric conversion element. In a focus detection optical system having a large viewing field mask and a small secondary image forming magnification, the photoelectric conversion element can detect light in a wide range of the imaging region. However, an increase in the size of an optical element for guiding a light flux in a wide range to the photoelectric conversion element in the focus detection optical system or in the size of the housing of the focus detection optical system may result in an increase in the size of the focus detection apparatus. Further, a decrease in the magnification of the secondary imaging lens degrades the sensitivity of the focus detection apparatus to changes in a relative positional relationship between object images on the photoelectric conversion element plane with respect to defocusing. Thus, the focus detection accuracy decreases. For downsizing of a focus detection apparatus, a method for shortening the distance between a pair of optical images formed on a photoelectric conversion element is used (see Japanese Patent Application Laid-Open No. 2006-322970). However, if adjacent optical images overlap each other, the adjacent optical images become noise, resulting in degraded focus detection accuracy.

As described above, three elements "wide field of view", "high accuracy", and "small size" are in a trade-off relationship in principle. A focus detection apparatus having a balance among the three elements is demanded.

A focus detection apparatus discussed in Japanese Patent Application Laid-Open No. 2006-322970 achieves both wider field of view and downsizing. More specifically, the shape of the viewing field mask is designed so that a region where optical images overlap each other is not formed on a photoelectric conversion element, and further an imaging region is not provided in a region where optical images are close to each other. However, shortening the distance between optical images degrades the sensitivity of the focus detection apparatus to changes in a relative positional relationship between object images on the photoelectric conversion element plane with respect to defocusing. This may lead to degradation in detection accuracy.

The present invention is directed to a focus detection apparatus capable of performing focus detection in a wide field of view while avoiding detection accuracy degradation and size increase.

SUMMARY OF THE INVENTION

According to an aspect of the present invention, an imaging apparatus includes a focus detection apparatus configured to split a light flux having passed through an exit pupil of an imaging optical system into a plurality of light fluxes corresponding to different regions of the exit pupil and form a plurality of optical images with the plurality of light fluxes by using optical members, perform photoelectric conversion on each of the plurality of optical images, and then perform focus detection of the imaging optical system. The focus detection apparatus includes a viewing field mask configured to determine contours of the plurality of optical images, a sensor including a plurality of pairs of focus detection regions in each of which the plurality of optical images is detected, a memory configured to store, as adjustment values, a plurality of pieces of data indicating positions of effective ranges in the plurality of pairs of focus detection regions, in a plurality of storage areas in such a way that each of the plurality of pieces of data is stored in a corresponding one of the plurality of storage area, and a control unit configured to control focus adjustment by detecting a focusing state of the imaging optical system from signals detected by the sensor in the effective ranges of the plurality of pairs of focus detection regions based on the adjustment values obtained from the memory.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Figure 1:
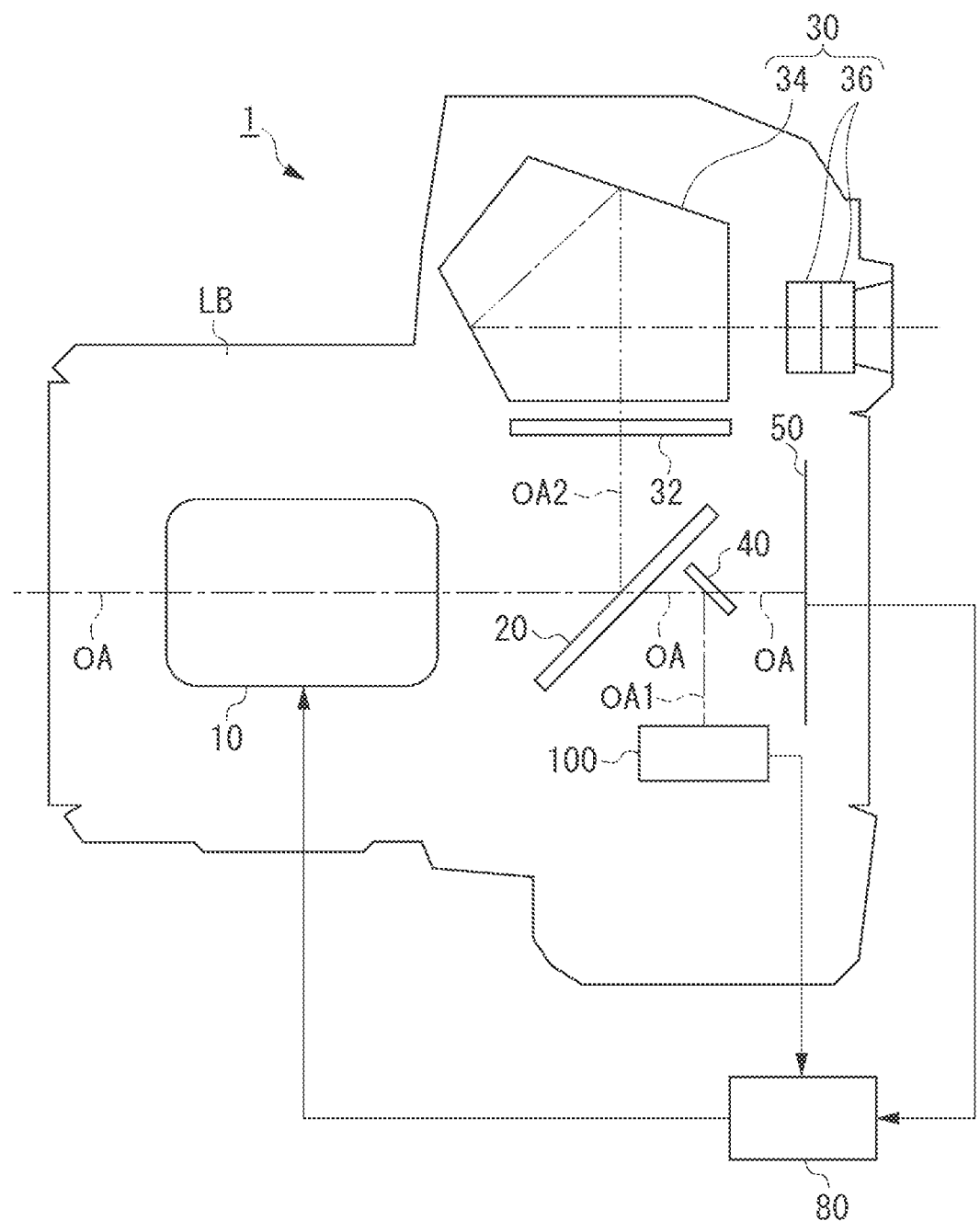
FIG. 1 schematically illustrates an example of a configuration of an imaging apparatus common to exemplary embodiments of the present invention.

An imaging apparatus 1 including a focus detection apparatus 100 according to a first exemplary embodiment of the present invention will be described below with reference to FIG. 1. FIG. 1 schematically illustrates a configuration of the imaging apparatus 1 according to the present exemplary embodiment.

The imaging apparatus 1 is, for example, a single-lens reflex camera and includes an imaging lens 10 and a camera main unit. The camera main unit is configured so that the imaging lens 10 can be attached thereto via a mounting unit (not illustrated). The imaging lens 10 is an interchangeable lens apparatus for capturing an image of an object, and has an imaging optical system including a focus adjustment lens (not illustrated) (hereinafter referred to as a focus lens). In the imaging lens 10, the driving of movable optical members of the imaging optical system is controlled by a control unit 80 in the camera main unit. For example, the control unit 80 controls the driving of the focus lens based on a result of focus detection processing by the focus detection apparatus 100 to adjust the focusing state of the imaging optical system. The imaging lens 10 is movably supported in the direction of an optical axis OA of the imaging optical system by a lens mirror barrel LB. The imaging lens 10 and the camera main unit are configured as separate units. A user can detach the imaging lens 10 from the camera main unit. Although the imaging lens 10 is not a component of the camera main unit, the imaging lens 10 needs to be attached to the camera main unit when the focus detection apparatus 100 performs focus detection. Hereinafter, the imaging lens 10 will be considered as a component of the imaging apparatus 1.

The camera main unit includes a main mirror 20, a viewfinder optical system 30, and a sub mirror 40. The main mirror 20 is configured as a half mirror having semi-permeability, or a movable mirror partly having a half mirror surface. The main mirror 20 reflects a part of light that has passed through the imaging lens 10, and guides the reflected light to the viewfinder optical system 30 along an optical axis OA2. A part of the light that has passed through the imaging lens 10 is transmitted through the main mirror 20. The transmitted light is then guided to the sub mirror 40 along the optical axis OA.

The viewfinder optical system 30 is an optical system used by the user to observe an object. In other words, the viewfinder optical system 30 presents to the user an image for observation that is equivalent to an image of an object to be captured. The viewfinder optical system 30 includes a focusing plate 32, a pentaprism 34, and an eyepiece lens 36. The light that is reflected on the main mirror 20 and then travels along the optical axis OA2 is condensed in the vicinity of the focusing plate 32. The focusing plate 32 is provided with a matt surface and a Fresnel surface on which a finder field is formed. The focusing plate 32 further diffuses the object light and emits the diffused light to the pentaprism 34. The pentaprism 34 serving as an optical path conversion element reflects the light diffused by the focusing plate 32 on a plurality of surfaces to guide the reflected light to the eyepiece lens 36. The eyepiece lens 36 is also referred to as an eyepiece. Through the eyepiece lens 36, the user can observe the finder field formed on the focusing plate 32.

The sub mirror 40 is disposed at a posterior position of the main mirror 20 in the optical axis OA direction (disposed on the imaging plane side). The sub mirror 40 reflects the light having penetrated the main mirror 20 (the transmitted light), and guides the reflected light to the focus detection apparatus 100 along an optical axis OA1. The optical axis OA1 is an optical axis that is deflected from the optical axis OA by the sub mirror 40. The sub mirror 40 is a movable optical member which can be inserted into and removed from an imaging optical path along the optical axis OA. The sub mirror 40 is disposed at a predetermined position on the imaging optical path (optical axis OA) during observation through the finder, and is retracted to the outside of the imaging optical path during image capturing.

An image sensor 50 has a pixel array including a plurality of regularly arranged pixels. The image sensor performs photoelectric conversion on optical images formed by the imaging optical system of the imaging lens 10, i.e., object images formed on the imaging plane, and outputs image signals. For example, the image sensor 50 is configured as a (two-dimensional) area sensor which performs photoelectric conversion on optical images formed on a light receiving surface on a pixel basis, accumulates electric charge according to the quantity of the received light, and reads the electric charge. For example, a complementary metal-oxide semiconductor (CMOS) image sensor or a charge-coupled device (CCD) image sensor is used as the image sensor 50. The signals output from the image sensor 50 are subjected to predetermined processing by an image processing circuit (not illustrated) to become image data, which is then converted into image data for recording. The image data obtained after the conversion is recorded on a recording medium, such as a semiconductor memory, an optical disk, and a magnetic tape.

The control unit 80 includes, for example, a central processing unit (CPU). A storage unit of the CPU stores various data. For example, the storage unit stores, as adjustment values, data indicating the effective ranges of focus detection regions 114A and 114B included in a sensor 114 (described below) inside the focus detection apparatus 100. The control unit 80 also functions as a focus detection unit for detecting the focusing state of the imaging lens 10 based on the adjustment values obtained from the storage unit. Although, in the present exemplary embodiment, the control unit 80 includes a storage unit, an external storage device may be used.

The focus detection apparatus 100 detects the focusing state of the imaging lens 10 by using the TTL phase difference method. The focus detection apparatus 100 splits a light flux having passed through an exit pupil of the imaging lens 10 and reflected on the sub mirror 40 into a plurality of light fluxes corresponding to different regions of the exit pupil, forms a plurality of images with the plurality of light fluxes, and then detects the focusing state of the imaging lens 10 according to a relative positional relationship between the plurality of images. More specifically, the focusing state of the imaging lens 10 can be detected based on signals obtained by performing photoelectric conversion on a pair of images by using detection elements. The focus detection apparatus 100 outputs a focus detection signal having focusing state detection information to the control unit 80.

Figure 2:
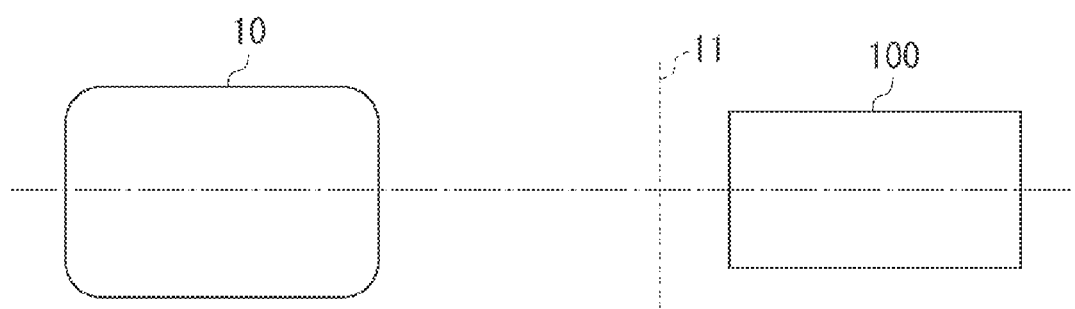
FIG. 2 schematically illustrates a positional relationship among an imaging lens, an expected imaging plane, and a focus detection apparatus according to the exemplary embodiments of the present invention.

FIG. 2 schematically illustrates a positional relationship among the imaging lens 10, an expected imaging plane 11, and the focus detection apparatus 100 according to the present exemplary embodiment. FIG. 2 illustrates the positional relationship among the imaging lens 10, the expected imaging plane 11, and the focus detection apparatus 100 in a state where the optical axis OA and the optical axis OA1 of the reflected light of the sub mirror 40 are illustrated in a linear way. The expected imaging plane 11 is an image plane optically equivalent to the light receiving surface of the image sensor 50. Because of the layout of the camera main unit, the focus detection apparatus 100 is generally disposed at a posterior position of the expected imaging plane 11 (disposed on the side apart from the sub mirror 40).

Figure 3A:
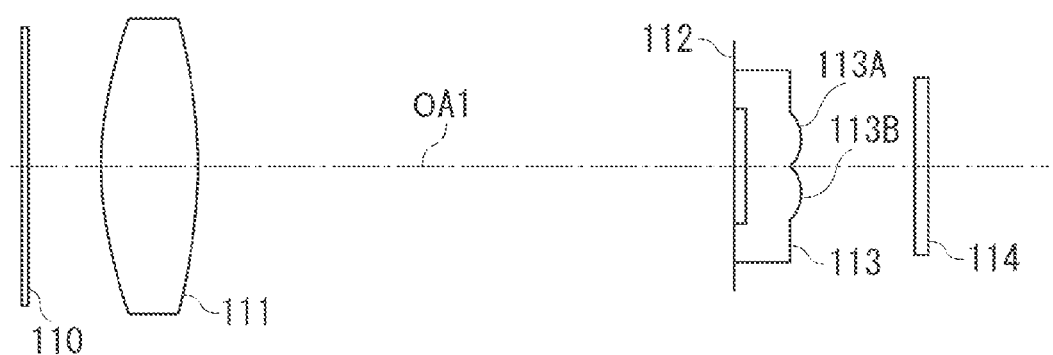
FIG. 3A is a detail view illustrating the focus detection apparatus according to the exemplary embodiments of the present invention.

FIG. 3A is a detail view illustrating a configuration of the focus detection apparatus 100 according to the present exemplary embodiment. The focus detection apparatus 100 includes a viewing field mask 110, a field lens 111, a multi-aperture stop 112, an image reforming lens unit 113, and a sensor (for focus detection) 114 sequentially disposed from the front side (the left-hand side in FIG. 3A) along the optical axis OA1. The sensor 114 employing a photoelectric conversion element is, for example, a CMOS sensor.

Figure 3B:
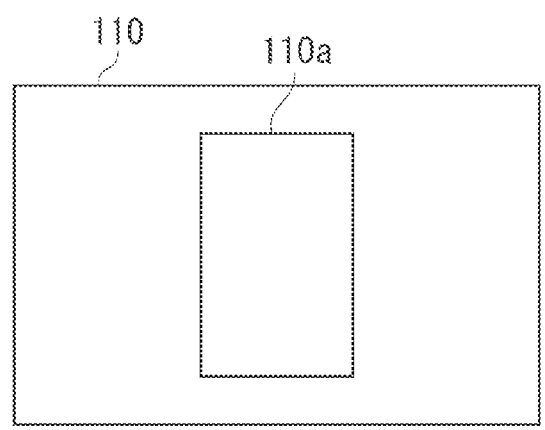
FIG. 3B is a schematic plan view illustrating a viewing field mask according to the exemplary embodiments of the present invention.

FIG. 3B is a schematic plan view illustrating the viewing field mask 110 in the focus detection apparatus 100. The viewing field mask 110 has a rectangular opening portion 110a at the center to limit the light flux that has passed through the imaging lens 10. As illustrated in FIG. 2, the focus detection apparatus 100 is disposed at a posterior position of the expected imaging plane 11 of the imaging lens 10 (disposed on the right-hand side in FIG. 2). Therefore, the viewing field mask 110 is also disposed at a posterior position of the expected imaging plane 11. Accordingly, the contour of optical images (projected images of the viewing field mask 110) formed on the sensor 114 will have a defocused region.

The field lens 111 is disposed at a posterior position of the viewing field mask 110 in the optical axis OA1 direction. The field lens 111 has a lens portion corresponding to the opening portion 110a of the viewing field mask 110. The multi-aperture stop 112, formed of a thin plate, is disposed at a posterior position of the field lens 111 in the optical axis OA1 direction (on the right-hand side in FIG. 3A). The multi-aperture stop 112 is disposed adjacent to the image reforming lens unit 113.

The image reforming lens unit 113 has a plurality of lens portions 113A and 113B corresponding to a plurality of pairs of opening portions in the multi-aperture stop 112. The image reforming lens unit 113 forms object images formed on the expected imaging plane 11 by the imaging lens 10, on a plurality of pairs of element arrays in the sensor 114. The sensor 114 is disposed at a posterior position of the image reforming lens unit 113 in the optical axis OA1 direction. In each of the pairs of element arrays, a plurality of detection elements is disposed in a predetermined direction (described below).

Figure 4:
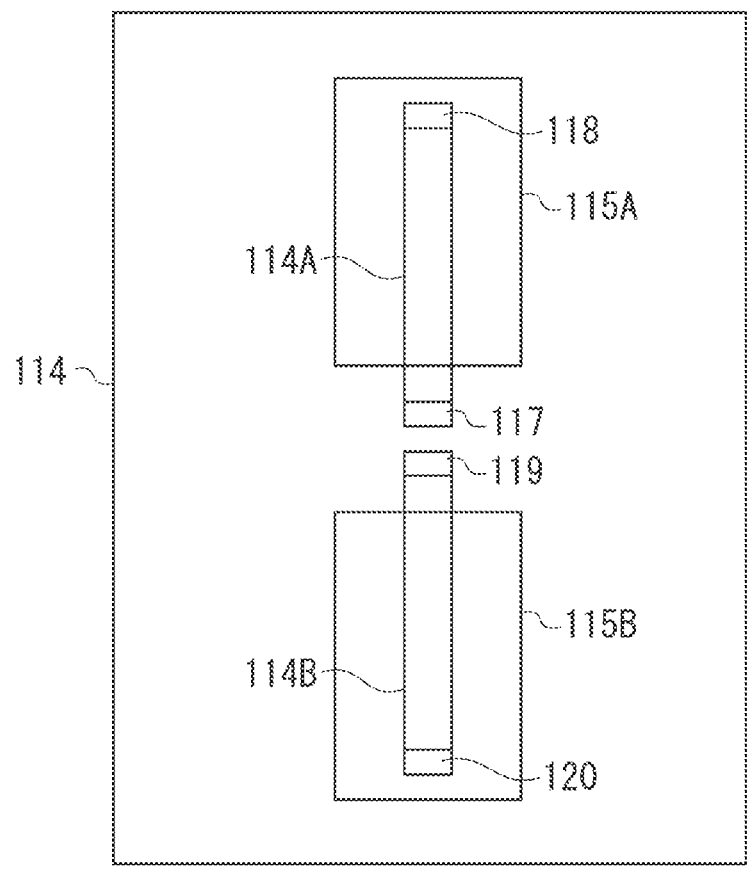
FIG. 4 is a schematic plan view illustrating positional relationships between focus detection regions and optical images according to a first exemplary embodiment of the present invention.

FIG. 4 is a schematic plan view illustrating positional relationships between the focus detection regions 114A and 114B and optical images 115A and 115B according to the present exemplary embodiment. The focus detection regions 114A and 114B extend in the dividing direction of the light flux that has passed the imaging lens 10. The optical image 115A is an optical image that has penetrated the image reforming lens unit 113A illustrated in FIG. 3A. The optical image 115B is an optical image that has penetrated the image reforming lens unit 113B illustrated in FIG. 3A. The focus detection region 114A is referred to as a first focus detection region, and the focus detection region 114B is referred to as a second focus detection region. Further, the optical image 115A is referred to as a first optical image, and the optical image 115B is referred to as a second optical image.

Figure 5:
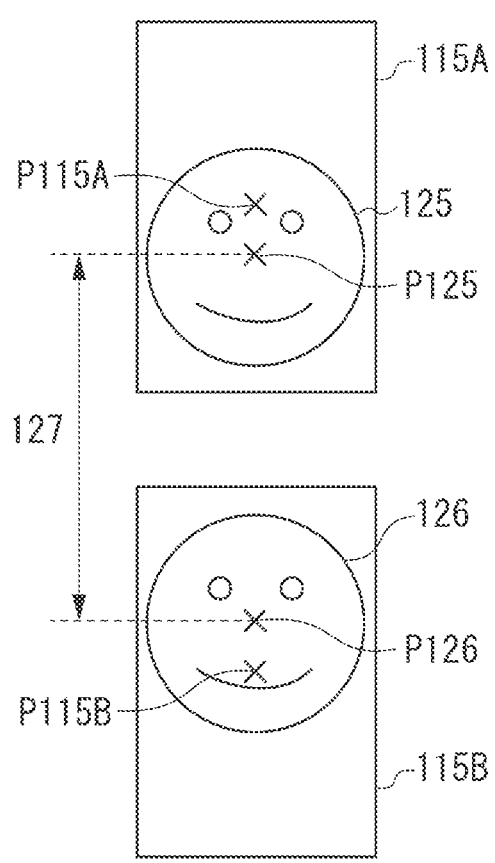
FIG. 5 is a schematic plan view illustrating a positional relationship between object images in optical images according to the first and a second exemplary embodiment of the present invention.

FIG. 5 is a schematic plan view illustrating a positional relationship between object images 125 and 126 in the optical images 115A and 115B, respectively, according to the present exemplary embodiment. Referring to FIG. 5, a point P115A indicates the center of the optical image 115A, and a point P115B indicates the center of the optical image 115B. Further, a point P125 indicates the center of the object image 125, and a point P126 indicates the center of the object image 126. A distance 127 between the points P125 and P126 is equivalent to a distance between the object images 125 and 126 in the in-focus state.

As illustrated in FIGS. 2 and 3A, when the viewing field mask 110 is disposed at a posterior position of the expected imaging plane 11 of the imaging lens 10, the object image 125 in the optical image 115A is formed more on the optical image 115B side of the optical image 115A than at the point P115A (the center of the optical image 115A). The object image 126 in the optical image 115B is formed more on the optical image 115A side than at the point P115B (the center of the optical image 115B). That is, focus detection can be performed even if the focus detection region 114A is disposed more on the optical image 115B side than at the center of the optical image 115A, and the focus detection region 114B is disposed more on the optical image 115A side than at the center of the optical image 115B, as illustrated in FIG. 4.

Figure 6:
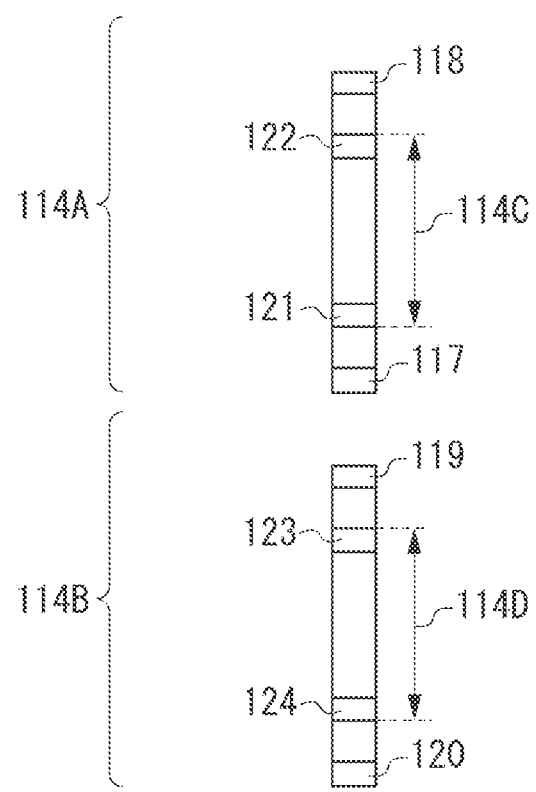
FIG. 6 is a detailed plan view illustrating focus detection regions according to the first to a third exemplary embodiment of the present invention.

FIG. 6 is a detailed plan view illustrating the focus detection regions 114A and 114B according to the present exemplary embodiment. FIG. 6 illustrates end pixels 117 and 118, an effective range 114C, and first and second effective pixel ends 121 and 122 in the focus detection region 114A. In the focus detection region 114A, an end pixel closer to the focus detection region 114B is the end pixel 117, and an end pixel on the opposite side is the end pixel 118. In the effective range 114C, an effective pixel end closer to the focus detection region 114B is the first effective pixel end 121, and an effective pixel end on the opposite side is the second effective pixel end 122.

FIG. 6 also illustrates end pixels 119 and 120, an effective range 114D, and third and fourth effective pixel ends 123 and 124 in the focus detection region 114B. In the focus detection region 114B, an end pixel closer to the focus detection region 114A is the end pixel 119, and an end pixel on the opposite side is the end pixel 120. In the focus detection region 114B, an effective pixel end closer to the focus detection region 114A is the third effective pixel end 123, and an effective pixel end on the opposite side is the fourth effective pixel end 124. In the present exemplary embodiment, in the focus detection region 114A, the end pixel 117 is referred to as a first end pixel, and the end pixel 118 is referred to as a second end pixel. In the focus detection region 114B, the end pixel 119 is referred to as a third end pixel, and the end pixel 120 is referred to as a fourth end pixel.

As illustrated in FIG. 4, the focus detection regions 114A and 114B are disposed extending outside the optical images 115A and 115B, respectively. Therefore, the pixels outside the optical images 115A and 115B cannot be used for focus detection. Accordingly, the control unit 80 obtains, from the storage unit, data of adjustment values indicating the effective ranges to be used for focus detection. Processing for writing the adjustment values to the storage unit is performed, for example, in the production process. More specifically, after observation of a uniform luminance surface, pixel numbers (pixel position information) with which the light quantity is sufficient (equal to or larger than a predetermined value) in each of the focus detection regions 114A and 114B are used as an adjustment value.

Hereinafter, a method for determining the effective ranges 114C and 114D of the focus detection regions 114A and 114B, respectively, will be described below.

The effective ranges 114C and 114D of the focus detection regions 114A and 114B are determined by detecting the positions of the optical images 115A and 115B relative to the focus detection regions 114A and 114B, respectively. As described above with reference to FIG. 5, the object images 125 and 126 are formed biased toward the inner side of the optical images 115A and 115B, respectively. Accordingly, as described above with reference to FIG. 4, the focus detection region 114A is disposed more on the optical image 115B side of the optical image 115A than at the center thereof, and the focus detection region 114B is disposed more on the optical image 115A side of the optical image 115B than at the center thereof.

As illustrated in FIG. 4, the positional relationships between the focus detection regions 114A and 114B and the optical images 115A and 115B, respectively are as follows. The first end pixel 117 is disposed outside the optical image 115A, and therefore the first effective pixel end 121 can be determined by detecting the end of the optical image 115A in the focus detection region 114A. The third end pixel 119 is disposed outside the optical image 115B, and therefore the third effective pixel end 123 can be determined by detecting the end of the optical image 115B in the focus detection region 114B.

The fourth effective pixel end 124 is a pixel disposed at a region apart from the first effective pixel end 121 by the distance 127 between the object images 125 and 126. The effective pixel ends 121 and 124 are used to detect the same region of the object. The second effective pixel end 122 is a pixel disposed at a region apart from the third effective pixel end 123 by the distance 127 between the object images 125 and 126. The effective pixel ends 123 and 122 are used to detect the same region of the object. In this case, the distance 127 between the object images 125 and 126 can be calculated based on design values of the focus detection apparatus 100.

Thus, the effective ranges 114C and 114D can be determined without detecting optical image end portions on both sides of the optical images 115A and 115B. Therefore, even if the end pixel 118 is disposed inside the optical image 115A, and the end pixel 120 is disposed inside the optical image 115B, the effective ranges 114C and 114D can be suitably determined. Data indicating the effective ranges 114C and 114D determined in this way are written to the storage unit of the control unit 80 as adjustment values.

Since the data of the effective ranges 114C and 114D is stored in the storage unit as adjustment values, the control unit 80 can perform focus detection in the effective ranges 114C and 114D. This means that information of the optical images 115A and 115B formed on the sensor 114 can be used for focus detection to a maximum extent. Thus, focus detection in a wide field of view can be achieved. Even if the end pixel 118 is disposed inside the optical image 115A, and the end pixel 120 is disposed inside the optical image 115B, the effective ranges 114C and 114D can be suitably determined. This contributes to the downsizing of the sensor 114.

According to the present exemplary embodiment, it is possible to achieve focus detection in a wide field of view while avoiding detection accuracy degradation and size increase.

A second exemplary embodiment of the present invention will be described below. The basic configuration of a focus detection apparatus according to the second exemplary embodiment is similar to that according to the first exemplary embodiment, and detailed description of each unit will thus be omitted. In the following descriptions, the above-described reference numerals will be used. Such omission of descriptions also applies to the other exemplary embodiments to be described below.

The following describes arrangements of the focus detection regions 114A and 114B and the optical images 115A and 115B, which are different from those according to the first exemplary embodiment.

Figure 7:
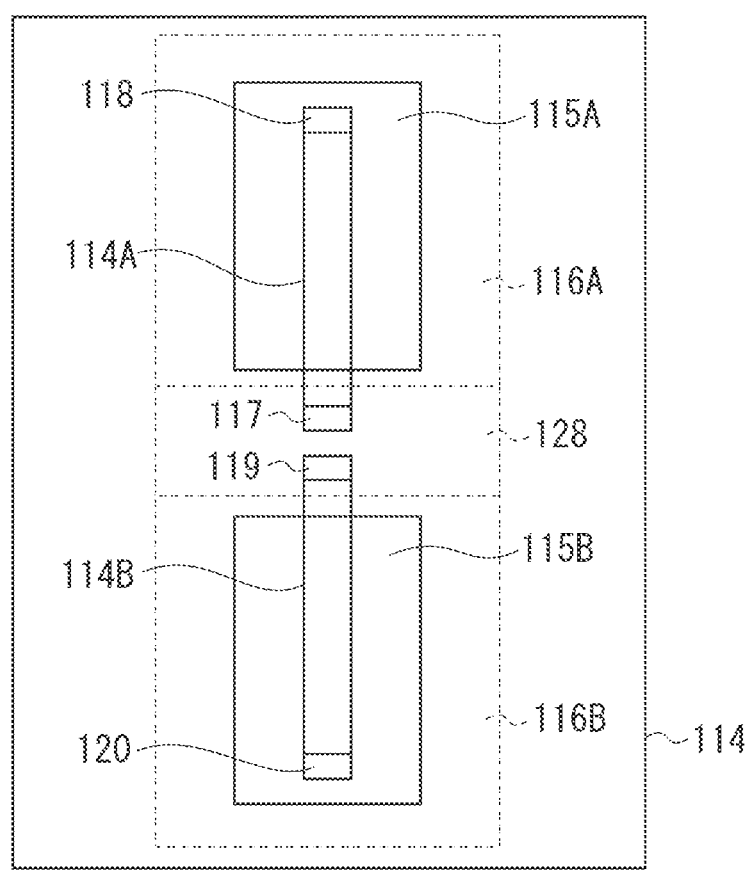
FIG. 7 is a schematic plan view illustrating positional relationships between focus detection regions and optical images according to the second exemplary embodiment of the present invention.

FIG. 7 is a schematic plan view illustrating positional relationships between the focus detection regions 114A and 114B and the optical images 115A and 115B according to the present exemplary embodiment. Regions 116A and 116B are defocused regions of the viewing field mask 110, which arise when the viewing field mask 110 is disposed at a plane different from the expected imaging plane 11 of the imaging lens 10. The defocused regions 116A and 116B partially overlap each other to form an overlapping region 128. The defocused region 116A is a first defocused region located so as to include the outer circumferential portion of the optical image 115A. The defocused region 116B is a second defocused region located so as to include the outer circumferential portion of the optical image 115B.

Both the end pixels 117 and 119 are disposed in the overlapping region 128. The end pixel 118 is disposed inside the optical image 115A. The end pixel 120 is disposed inside the optical image 115B. Since the end pixel 117 is disposed in the overlapping region 128, when the object is, for example, a uniform luminance surface, the overlapping region 128, the defocused region 116A, and the optical image 115A can be distinguished in the focus detection region 114A based on the light intensity. Thus, the effective pixel end 121 can be determined. Since the end pixel 119 is also disposed in the overlapping region 128, when the object is, for example, a uniform luminance surface, the overlapping region 128, the defocused region 116B, and the optical image 115B can be distinguished in the focus detection region 114B based on the light intensity. Thus, the effective pixel end 123 can be determined. Similarly to the first exemplary embodiment, the effective pixel ends 121 and 124 are used to detect the same region of the object, and the effective pixel ends 122 and 123 are used to detect the same region of the object.

In the present exemplary embodiment, similarly to the first exemplary embodiment, the effective ranges 114C and 114D can be determined without detecting optical image end portions on both sides of the optical images 115A and 115B, respectively. Therefore, even if the end pixel 118 is disposed inside the optical image 115A and the end pixel 120 is disposed inside the optical image 115B, the effective ranges 114C and 114D can be suitably determined. The overlapping region 128 can be suitably excluded from the effective ranges 114C and 114D by detecting the light intensity in the defocused regions 116A and 116B and the overlapping region 128, respectively. Thus, focus detection in a wide field of view can be achieved while avoiding detection accuracy degradation and size increase.

A third exemplary embodiment of the present invention will be described below. The basic configuration of a focus detection apparatus according to the present exemplary embodiment is similar to that according to the first exemplary embodiment. The following describes arrangements of the focus detection regions 114A and 114B and the optical images 115A and 115B, which are different from those according to the first exemplary embodiment.

Figure 8:
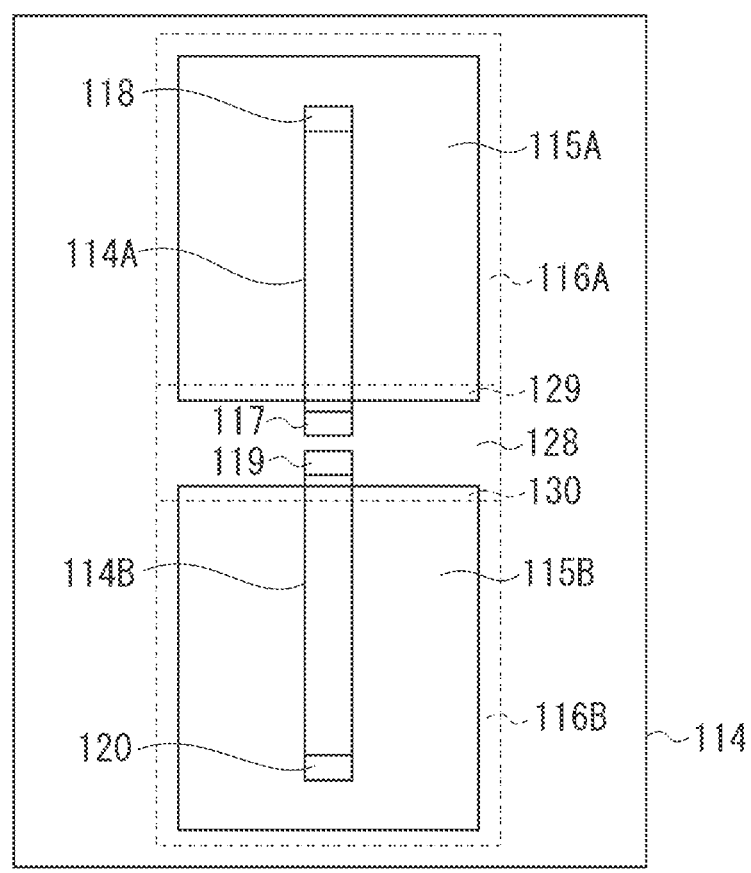
FIG. 8 is a schematic plan view illustrating positional relationships between focus detection regions and optical images according to the third exemplary embodiment of the present invention.

FIG. 8 is a schematic plan view illustrating positional relationships between the focus detection regions 114A and 114B and the optical images 115A and 115B according to the present exemplary embodiment. The regions 116A and 116B are defocused regions of the viewing field mask 110, which arise when the viewing field mask 110 is disposed at a plane different from the expected imaging plane 11 of the imaging lens 10. The optical images 115A and 115B overlap each other to form the overlapping region 128. The defocused region 116B and the optical image 115A overlap each other to form an overlapping region 129. The defocused region 116A and the optical image 115B overlap each other to form an overlapping region 130. The defocused region 116A is a first defocused region located so as to include the outer circumferential portion of the optical image 115A. The defocused region 116B is a second defocused region located so as to include the outer circumferential portion of the optical image 115B.

The end pixels 117 and 119 are disposed in the overlapping region 128. The end pixel 118 is disposed inside the optical image 115A. The end pixel 120 is disposed inside the optical image 115B.

Since the end pixel 117 is disposed inside the overlapping region 128, when the object is, for example, a uniform luminance surface, the overlapping region 128, the overlapping region 129, and the optical image 115A can be distinguished in the focus detection region 114A based on the light intensity. Thus, the effective pixel end 121 can be determined. Since the end pixel 119 is disposed inside the overlapping region 128, when the object is, for example, a uniform luminance surface, the overlapping region 128, the overlapping region 130, and the optical image 115B can be distinguished in the focus detection region 114B based on the light intensity. Thus, the effective pixel end 123 can be determined.

In the present exemplary embodiment, similarly to the first exemplary embodiment, the effective ranges 114C and 114D can be determined without detecting optical image end portions on both sides of the optical images 115A and 115B, respectively. Therefore, even if the end pixel 118 is disposed inside the optical image 115A and the end pixel 120 is disposed inside the optical image 115B, the effective ranges 114C and 114D can be suitably determined, respectively. The overlapping regions 128, 129, and 130 can be suitably excluded from the effective ranges 114C and 114D by detecting the light intensity in the overlapping regions 128, 129, and 130. Thus, focus detection in a wide field of view can be achieved while avoiding detection accuracy degradation and size increase.

A fourth exemplary embodiment of the present invention will be described below. In the present exemplary embodiment, unlike the first to the third exemplary embodiments, a plurality of pairs of focus detection regions is provided. The storage unit for storing adjustment values includes a plurality of storage areas (e.g., 80A1, 80B1, 80A2, and 80B2) each corresponding to a different one of the plurality of pairs of focus detection regions. Other configurations and focus detection operations are similar to those according to the first exemplary embodiment, and detailed descriptions thereof will thus be omitted.

Figure 9:
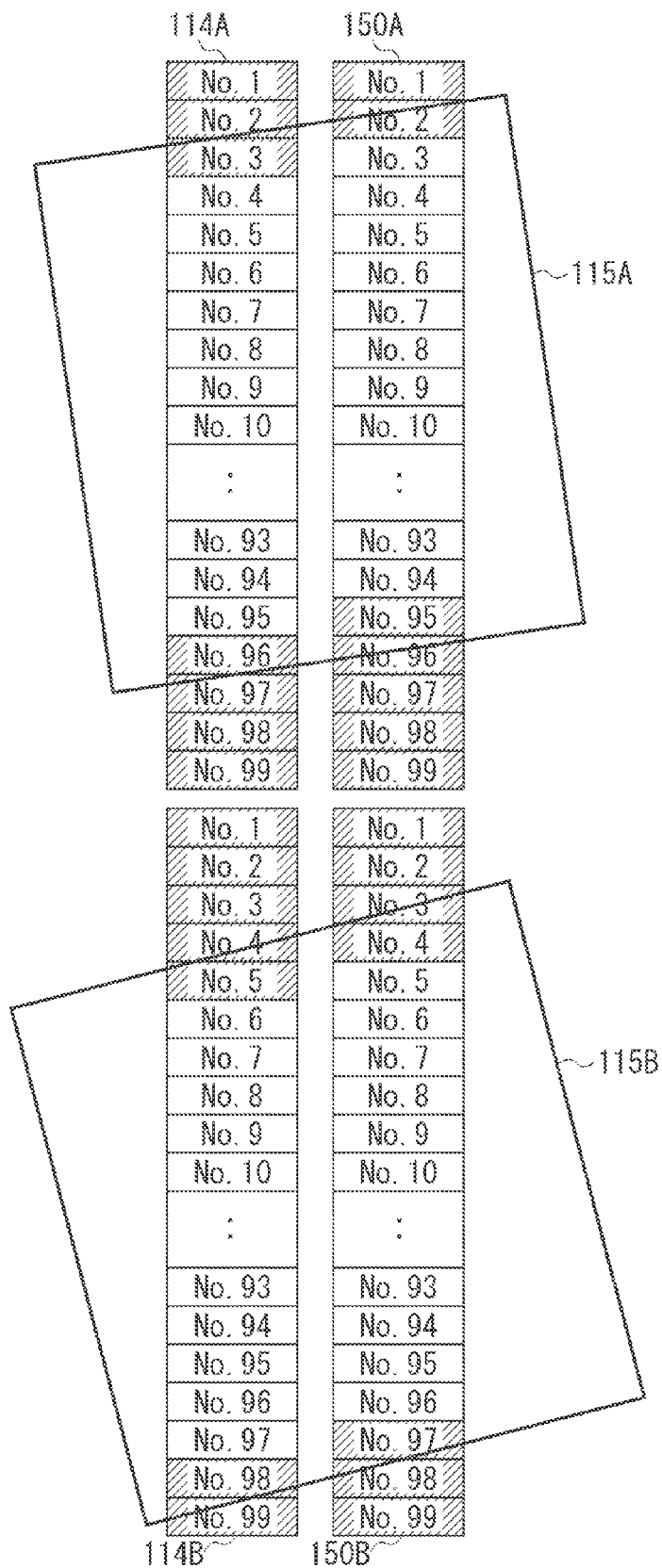
FIG. 9 is a schematic plan view illustrating positional relationships between a plurality of pairs of focus detection regions and optical images according to a fourth exemplary embodiment of the present invention.

FIG. 9 is a schematic plan view illustrating positional relationships between a plurality of focus detection regions and optical images according to the present exemplary embodiment. In the following example of the present exemplary embodiment, the optical images 115A and 115B on the viewing field mask 110 are inclined with respect to focus detection regions 114A and 150A, and 114B and 150B, respectively. Adjustment values stored in the plurality of storage areas will be described below.

Each of the plurality of focus detection regions 114A, 114B, 150A, and 150B includes a plurality of pixels. In the following example, each of the focus detection regions 114A, 114B, 150A, and 150B includes 99 pixels (refer to Nos. 1 to 99).

The inclination of an optical image is caused by, for example, a processing error of the shape of the opening of the viewing field mask 110, a positional deviation or an inclination of the viewing field mask 110, or an optical distortion due to the field lens 111 and the image reforming lens unit 113.

The adjustment value stored in each of the storage areas will be described below. Similarly to the first to the third exemplary embodiments, data of the adjustment value is stored in each of the storage areas, for example, in a production process. More specifically, when observing a uniform luminance surface, pixel numbers having a sufficient light quantity (equal to or larger than a predetermined value) in each of the focus detection regions 114A, 114B, 150A, and 150B are used as an adjustment value. In each of the focus detection regions 114A, 114B, 150A, and 150B, a pixel from which the light quantity is sufficient differs from apparatus to apparatus depending on mechanical units and optical tolerances.

In the example illustrated in FIG. 9, the arrangements of the focus detection regions 114A, 114B, 150A, and 150B and the optical images 115A and 115B are as follows:

In the focus detection region 114A, pixel Nos. 4 to 95 are located inside the optical image 115A.

In the focus detection region 114B, pixel Nos. 6 to 97 are located inside the optical image 115B.

In the focus detection region 150A, pixel Nos. 3 to 94 are disposed inside the optical image 115A.

In the focus detection region 150B, pixel Nos. 5 to 96 are disposed inside the optical image 115B.

In the above-described arrangements, the following adjustment values are stored in the storage areas:

In the storage area 80A1 for storing the effective range information of the focus detection region 114A, pixel Nos. 4 to 95 are stored as an effective range.

In the storage area 80B1 for storing the effective range information of the focus detection region 114B, pixel Nos. 6 to 97 are stored as an effective range.

In the storage area 80A2 for storing the effective range information of the focus detection region 150A, pixel Nos. 3 to 94 are stored as an effective range.

In the storage area 80B2 for storing the effective range information of the focus detection region 150B, pixel Nos. 5 to 96 are stored as an effective range.

As described above, the focus detection apparatus according to the present exemplary embodiment includes a plurality of storage areas each corresponding to a different one of the plurality of focus detection regions. More specifically, for example, the storage areas 80A1 and 80A2 respectively store different adjustment values for different focus detection regions. Further, for example, the storage areas 80A1 and 80B1 respectively store different adjustment values for focus detection regions obtained by dividing the same focus detection region. In other words, for each of the plurality of focus detection regions, focus detection can be performed by using a different region as an effective range. Therefore, a wider range can be used as an effective range than in a case where an identical adjustment value is used for all of focus detection regions, thereby enabling focus detection in a wide range.

In the configuration according to the present exemplary embodiment, pixels at both ends of each of the focus detection regions are disposed outside the relevant optical image. However, the configuration is not limited thereto. Similarly to the first to the third exemplary embodiments, only one end of each of the focus detection regions may be disposed outside the relevant optical image. In this case, the focus detection sensor can be downsized to a further extent.

According to the exemplary embodiments of the present invention, focus detection in a wide field of view can be performed while avoiding detection accuracy degradation and size increase.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-008572 filed Jan. 21, 2014, which is hereby incorporated by reference herein in its entirety.

What is claimed is:

1. An imaging apparatus comprising a focus detection apparatus configured to split a light flux having passed through an exit pupil of an imaging optical system into a plurality of light fluxes corresponding to different regions of the exit pupil and form a plurality of optical images with the plurality of light fluxes by using optical members, perform photoelectric conversion on each of the plurality of optical images, and then perform focus detection of the imaging optical system, wherein the focus detection apparatus comprises:
   a viewing field mask configured to determine contours of the plurality of optical images;
   a sensor including a plurality of pairs of focus detection regions in each of which the plurality of optical images is detected, wherein in the focus detection regions, there is a plurality of photoelectric conversion portions in line;
   a memory configured to store, as adjustment values, a plurality of pieces of data indicating positions of the photoelectric conversion portion corresponding to effective ranges in the plurality of pairs of focus detection regions, in a plurality of storage areas in such a way that each of the plurality of pieces of data is stored in a corresponding one of the plurality of storage areas; and
   a controller configured to control focus adjustment by detecting a focusing state of the imaging optical system from signals detected by the sensor in the effective ranges of the plurality of pairs of focus detection regions based on the adjustment values obtained from the memory.

2. The imaging apparatus according to claim 1, wherein the viewing field mask disposed more on a side of the sensor than an expected imaging plane of the imaging optical system determines contours of a first optical image and a second optical image to be formed,
   wherein, in relation to the plurality of pairs of focus detection regions, the sensor includes a first focus detection region for detecting the first optical image and a second focus detection region for detecting the second optical image,
   wherein the memory stores, as adjustment values, data indicating a position of an effective range disposed inside the first optical image in the first focus detection region, and data indicating a position of an effective range disposed inside the second optical image in the second focus detection region, and
   wherein the control unit controls the focus adjustment by detecting the focusing state of the imaging optical system from signals detected by the sensor in the effective ranges of the first and the second focus detection regions based on the adjustment values obtained from the memory.

3. The imaging apparatus according to claim 2, wherein, in the sensor, an end pixel disposed on a side of the second focus detection region in the first focus detection region is located outside the first optical image, and an end pixel disposed on a side of the first focus detection region in the second focus detection region is located outside the second optical image.

4. The imaging apparatus according to claim 3, wherein the end pixels are disposed in an overlapping region where the first and the second optical images overlap each other.

5. The imaging apparatus according to claim 3, wherein the end pixels are disposed in an overlapping region where a first defocused region located outside the first optical image and a second defocused region located outside the second optical image overlap each other.

6. The imaging apparatus according to claim 2, wherein the control unit obtains the adjustment values from the memory to determine, in the first focus detection region, a first effective pixel end located on the side of the second focus detection region and a second effective pixel end located on a side opposite to the second focus detection region, and determine, in the second focus detection region, a third effective pixel end located on the side of the first focus detection region and a fourth effective pixel end located on a side opposite to the first focus detection region.

7. The imaging apparatus according to claim 6, wherein the sensor detects a same region of an object at the first and the fourth effective pixel ends, and detects a same region of the object at the second and the third effective pixel ends.

8. The imaging apparatus according to claim 2, wherein the first and the second focus detection regions extend along a dividing direction of the light flux having passed through the imaging optical system.

* * * * *